Patented Mar. 17, 1942

2,276,828

UNITED STATES PATENT OFFICE 2,276,828

RESINOUS REACTION PRODUCTS OF ALIPHATIC ALDEHYDES AND NITROGEN-CONTAINING METHYLENE COMPOUNDS

Gaetano F. D'Alelio, Pittsfield, Mass., assignor to General Electric Company, a corporation of New York No Drawing. Application April 29, 1938, Serial No. 205,007

22 Claims. (Cl. 260—42)

This application is a continuation-in-part of my copending application, Serial No. 169,465, filed October 16, 1937, Patent No. 2,239,440, and assigned to the same assignee as the present invention.

This invention relates to resinous compositions and to the production of the same.

The present invention is based on the discovery that organic compounds having a methylene group attached to two carbon atoms which are at least double bonded, and one of which is attached to a nitrogen atom and the other to an organic group that need not be reactive, constitute a class of substances which on reaction with an aliphatic aldehyde, for example, formaldehyde, form resinous compositions which are of interest to the plastic, paint and textile industries.

The grouping of this class of substances may be represented generally as (a) 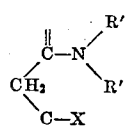

(b) 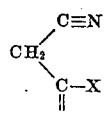

where X is a grouping of the class represented by R and OR, R is a member of the class consisting of alkyl and aryl groupings and R' is a member of the class which is the same as R and, in addition, hydrogen. Illustrative examples of compounds falling under (a) are: acetoacetamide, the monoamide of an alkyl malonate as, for instance, ethyl malonate, acetoacetanilide, the half amide of p-hydroxy phenyl malonic ester, etc. and illustrative examples of compounds falling under (b) are: cyanoethyl acetate, cyanoacetone, etc. As noted, the carbon atoms adjacent to the methylene group are at least double bonded, and one of these carbons may be attached by a triple bond to a nitrogen or if attached by a single bond then that carbon is bonded to a double bonded element such as oxygen or sulfur, or a double bonded radical such as the imine group (=NH); the other carbon adjacent to the methylene is bonded to a double bonded element or radical and the remaining bond linked to an organic radical or grouping that need not be reactive.

The present invention is distinguished from the invention described and claimed in my copending application Serial No. 169,465 in that the invention of the former application relates to the class of compounds which have three active points for condensation with aliphatic aldehydes. For example, malonic diamide reacts with formaldehyde on the each of its two nitrogen atoms as well as on the carbon atom of its methylene group. In the class of compounds described in this invention the fundamental groups located for reaction with aliphatic aldehydes to prepare resinous compositions are only two; e. g. the methylene group (—CH₂—) and the nitrogen of the half amide of malonic ester,

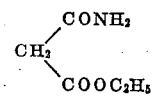

both react with aliphatic aldehydes; a third or fourth reactive group may be present but is not essential to resin formation. By way of example, if formaldehyde is condensed with the half amide of para-hydroxy phenyl malonic ester,

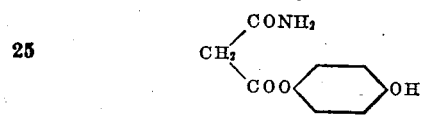

the phenolic hydroxyl also would react with aliphatic aldehydes, giving three reactive points. This third group may be desired but is not essential to resinification. This class of compounds under consideration has been found to react with aliphatic aldehydes in the presence of either alkaline or acid catalysts or without the addition of catalysts to give resins varying from sticky masses soluble in water to hard powders soluble and insoluble in water, all of which become plastic under heat and pressure. Alkaline catalysts appear to favor a more rapid condensation between ingredients comprising an aliphatic aldehyde and this class of compounds than acidic or neutral conditions. Various proportions of aliphatic aldehydes may be used in the condensation from an amount insufficient to combine with the compound in molecular proportions to an excess of the aliphatic aldehyde, e. g. one mol of diacetoacetyl ethylene diamine may be condensed with 1 to 7 mols of formaldehyde to form masses with different properties.

Methylol compounds as intermediates are formed by the condensation of this class of compounds with aliphatic aldehydes but they differ from the methylols of urea or adipic diamide, for example, inasmuch as the methylol is formed on the methylene group as well as on the nitrogen.

Taking the half amide of malonic ester as an example for reaction with formaldehyde, the following reaction probably occurs:

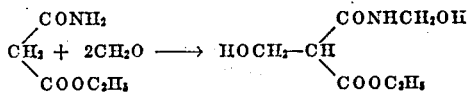

and this dimethylol derivative probably dehydrates to water and

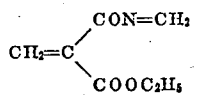

Thus the methylene group of the starting malonic ester amide participates in the reaction relating to the essentials of the discovery that a methylene group adjacent to two double bonded carbon atoms react with aliphatic aldehydes, e. g. formaldehyde, to give compounds of a resinous nature, or compounds which under the influence of heat or catalyst give resinous compositions.

The properties of the condensation products may be altered by the addition before, during or after the condensation of materials which themselves form resins. Urea, phenols, cresols, aniline, malonic diamide and the like are examples of compounds which may be used. These compounds are capable of forming methylol derivatives as intermediates during resin formation.

The condensation may be carried out in an aqueous formaldehyde solution or in the presence of hydroxyl bearing compounds such as alcohol, or in a non-aqueous solvent such as butyl alcohol. The reaction may be effected utilizing formaldehyde in gaseous state or in solid state such as paraform. Most of the resins obtained will advance in softening point when heated so as to become higher melting or infusible substances. Hardening agents, such as acid substances, may be used to advance the fusible products to a more infusible state.

Example I 10 parts by weight of the monoamide of ethyl malonate, 13 parts of 37.1% formalin solution and 0.1 part of sodium hydroxide dissolved in 10 parts of water are refluxed one hour and dehydrated giving a very clear pale yellow resin soluble in water and alcohol. The resin melts to a clear film and advances in softening point on heating at 160° C. becoming more insoluble in water on prolonged heating.

Example II 2 parts diacetoacetyl ethylene diamine and 1 part paraform are gently heated together with stirring till reaction starts at about 120° C. and then cautiously heated till no further reaction occurs. The resinous material that forms is of a pale light yellow color, soluble in boiling hot water and almost insoluble in ethyl alcohol. The resin becomes infusible and insoluble on heating to 160° C. Acid materials such as phthalic anhydride accelerate the transformation to the infusible state.

Example III 5 parts diacetoacetyl ethylene diamine, 1.77 parts of 37.1% formalin solution are mixed and to the mixture is added 0.05 part sodium hydroxide in 50 parts of water. The viscosity of the solution immediately increases and when evaporated forms clear transparent films with high gloss and which are difficult to scratch with the fingernail. When heated to 160° C. the films become infusible and remain quite flexible. When cloth is impregnated with the syrup and dried, a starched effect is produced.

Example IV 10 parts diacetoacetyl ethylene diamine is dissolved in 14.12 parts of 37.1% formalin solution and 0.1 part NaOH in 5 parts of water are mixed and a gel is immediately formed which is initially firm and clear, insoluble in water and alcohol after formation and becomes hydrophobic on standing. The water is tenaciously held but if spread and heated to 160° C. on a hot plate with the application of pressure, infusible films are formed.

If the above condensation is carried out in the presence of 50 parts of water a similar gel is obtained which becomes opaque on standing. A resin free from water is obtained if 2 parts of diacetoacetyl ethylene diamine, 1 part paraform, 2 parts of butyl alcohol and 0.2 part ethylene diamine are refluxed for ½ to 1 hour with stirring. Butyl alcohol is a non-solvent.

Example V 10 parts acetoacetamide, 16.2 parts of 37.1% formalin and 0.1 part of sodium hydroxide in 10 parts of water are refluxed for 1 hour and dehydrated to a soft reddish resin with a greenish efflorescence. The resin may be advanced to a higher softening point by heating to 160° C. for 15 minutes.

Example VI 10 parts acetoacetanilide, 16.1 parts of 37.1% formalin solution, 0.1 part sodium hydroxide in 10 parts of water are mixed and refluxed for 1 hour and dehydrated to a pale resin insoluble in water but soluble in ethyl alcohol. When alcoholic solutions are evaporated they leave clear transparent films which are quite resistant to scratching. The softening point of the resin is advanced when heated to 160° C.

Example VII 5 parts of acetoacetanilide, 4 parts of 37.1% formalin solution and 0.05 part of NaOH in 10 parts of water are refluxed for one hour and then dehydrated giving a resin somewhat similar to that in the previous example but not as clear.

Example VIII 11 parts cyanoethyl acetate, 16.0 parts 37.1% formalin solution, 0.1 part sodium carbonate in 10 parts of water are mixed and enough heat is generated to bring the mixture from room temperature to reflux. On the addition of the carbonate the mixture becomes homogeneous and on reflux two layers are formed. Dehydration gives a resin fluid at room temperature which on continued heating at 70° C. results in advancing the softening point.

Example IX 2 parts of the half amide of ethyl malonate, 6 parts of urea, 14.9 parts of 37.1% formalin solution and 0.08 part of sodium hydroxide in 5 parts of water are refluxed one hour giving a mixture with milky turbidity. On evaporation the reaction gives a resin which advances in softening point to give rubbery elastic films at 160° C. On mixing the resin with acidic substances insoluble and infusible films are obtained at 160° C. under heat and pressure.

Example X 94 parts of phenol, 57 parts diacetoacetyl ethylene diamine, 200 parts of 37.1% formalin solution are mixed and heated to effect solution. 1 part of sodium hydroxide in 10 parts of water is then added and the mixture refluxed for ½ hour. A separation into two phases occurs. On evaporation, a light yellow resin is obtained which is insoluble in water, which on further heating becomes insoluble and infusible. If, to the syrup before dehydration there is added 150-160 parts of a filler, such as alpha flock (alpha cellulose in flock form), and the product then is dehydrated under vacuum or at 70° C. at atmospheric condition, a moldable compound is obtained. The molding may be done at 160° C. at 2000 pounds per square inch.

The foregoing examples are merely illustrative in nature of the invention. It will be apparent to those skilled in the art that other organic compounds of the class described may be reacted with various aliphatic aldehydes, of which formaldehyde is only a typical example, and that the proportions given in the examples are not limiting but illustrative of proportions of reactants which may be used.

From the foregoing description it will be seen that the present invention provides new and useful resinous compositions, varnishes, molding compositions and molded articles comprising a product of reaction of ingredients comprising essentially (that is, of a mass or mixture containing as essential components) an aliphatic aldehyde, specifically, formaldehyde, and an organic compound selected from the class of organic compounds represented by the general formulas (a)

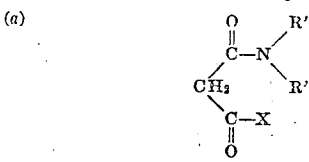

and (b)

where X is a grouping of the class represented by R and OR, R is a member of the class consisting of alkyl and aryl groupings and R' is a member of the class which is the same as R and, in addition, hydrogen. The invention also provides reaction products wherein other reactive compounds (e. g., a phenol, aniline, urea, malonic diamide) constitute modifying reactants in addition to an aliphatic aldehyde and a methylene-containing nitrogen compound of the kind above described.

Compositions comprising the reaction product of ingredients comprising an aldehyde, more particularly an aliphatic aldehyde such as formaldehyde, and diaceto-acetal ethylene diamine, which also may be written di-(acetoacetyl) ethylene diamine, are claimed in my copending application Serial No. 417,138, filed October 30, 1941, which application is a continuation-in-part of the present application. Compositions comprising the reaction product of ingredients comprising an aldehyde, e. g., formaldehyde, and at least one compound selected from the class consisting of aceto-acetanilide and halogenated acetoacetanilides, are claimed in my copending application Serial No. 416,991, filed October 29, 1941, which application also is a continuation-in-part of the present application. Both of these applications are assigned to the same assignee as the present application.

What I claim as new and desire to secure by Letters Patent of the United States is:

1. A resinous composition comprising the product of reaction of a mixture containing as essential components (1) urea, (2) an aliphatic aldehyde and (3) a methylene-containing nitrogen compound selected from the class of compounds represented by the general formulas (a)

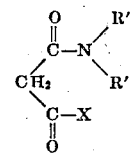

and (b)

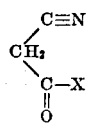

where X is a grouping of the class represented by R and OR, R is a member of the class consisting of alkyl and aryl groupings and R' is a member of the class which is the same as R and, in addition, hydrogen.

2. A composition of matter comprising the resinous product of reaction of ingredients comprising an aliphatic aldehyde and a methylene-containing nitrogen compound selected from the class of compounds represented by the general formulas (a)

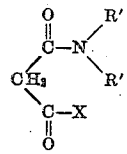

and (b)

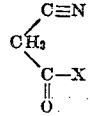

where X is a grouping of the class represented by R and OR, R is a member of the class consisting of alkyl and aryl groupings and R' is a member of the class which is the same as R and, in addition, hydrogen.

3. A composition of matter comprising the resinous product of reaction of ingredients comprising formaldehyde and a methylene-containing nitrogen compound corresponding to the general formula

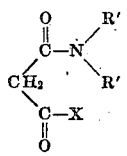

where X is a grouping of the class represented by R and OR, R is a member of the class consisting of alkyl and aryl groupings and R' is a member of the class which is the same as R and, in addition, hydrogen.

4. A resinous composition comprising the product of reaction of ingredients comprising an aliphatic aldehyde and the half amide of malonic ester.

5. A resinous composition comprising the product of reaction of ingredients comprising an aliphatic aldehyde and the half amide of p-hydroxy phenyl malonic ester.

6. A resinous composition comprising the reaction product of ingredients comprising an aliphatic aldehyde and acetoacetamide.

7. A composition of matter comprising the resinous product of reaction of ingredients comprising formaldehyde and a methylene-containing nitrogen compound corresponding to the general formula

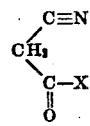

where X is a grouping represented by R and OR, and R is a member of the class consisting of alkyl and aryl groupings.

8. A composition comprising the alcohol-modified product of reaction of ingredients comprising urea, formaldehyde and a methylene-containing nitrogen compound selected from the class of compounds represented by the general formulas

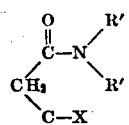

and

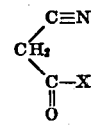

where X is a grouping of the class represented by R and OR, R is a member of the class consisting of alkyl and aryl groupings and R' is a member of the class which is the same as R and, in addition, hydrogen.

9. A resinous composition produced by the reaction of a phenol, formaldehyde and a methylene-containing nitrogen compound selected from the class of compounds represented by the general formulas

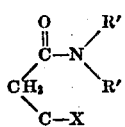

and

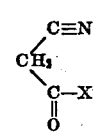

where X is a grouping of the class represented by R and OR, R is a member of the class consisting of alkyl and aryl groupings and R' is a member of the class which is the same as R and, in addition, hydrogen.

10. A resinous composition produced by the reaction of a mixture containing urea, formaldehyde and a methylene-containing nitrogen compound selected from the class of compounds represented by the general formulas

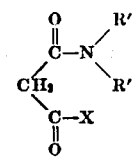

and

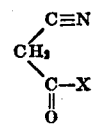

where X is a grouping of the class represented by R and OR, R is a member of the class consisting of alkyl and aryl groupings and R' is a member of the class which is the same as R and, in addition, hydrogen.

11. A resinous composition produced by the co-condensation of phenol and acetoacetamide with formaldehyde.

12. A resinous composition produced by the co-condensation of urea and the half amide of ethyl malonate with formaldehyde.

13. A resinous composition as in claim 4 wherein the aliphatic aldehyde reactant is formaldehyde.

14. A resinous composition as in claim 5 wherein the aliphatic aldehyde reactant is formaldehyde.

15. A heat-convertible resinous composition comprising a soluble, fusible resinous reaction product of ingredients comprising (1) urea, (2) formaldehyde and (3) a methylene-containing nitrogen compound selected from the class of compounds represented by the general formulas

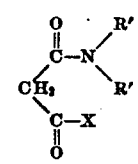

and

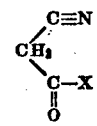

where X is a grouping of the class represented by R and OR, R is a member of the class consisting of alkyl and aryl groupings and R' is a member of the class which is the same as R and in addition hydrogen.

16. A product comprising the cured resinous composition of claim 15.

17. A heat-hardenable molding composition comprising a filler and a heat-convertible resinous reaction product of a mass containing (1) urea, (2) formaldehyde and (3) a methylene-containing nitrogen compond selected from the class of compounds represented by the general formulas (a) 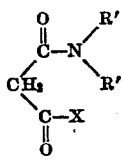

and (b) 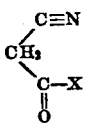

where X is a grouping of the class represented by R and OR, R is a member of the class consisting of alkyl and aryl groupings and R' is a member of the class which is the same as R and, in addition, hydrogen.

18. An article of manufacture comprising the heat-hardened molding composition of claim 17.

19. A composition comprising an alcohol-modified resinous product of reaction of a mixture containing as essential components an aliphatic aldehyde and a methylene-containing nitrogen compound selected from the class of compounds represented by the general formulas (a) 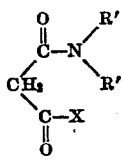

and (b) 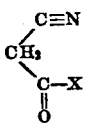

where X is a grouping of the class represented by R and OR, R is a member of the class consisting of alkyl and aryl groupings and R' is a member of the class which is the same as R and, in addition, hydrogen.

20. A resinous composition comprising the product of reaction of ingredients comprising the half amide of malonic ester, urea and formaldehyde.

21. A resinous composition comprising the product of reaction of ingredients comprising the half amide of p-hydroxy phenyl malonic ester, urea and formaldehyde.

22. A resinous composition comprising the product of reaction of ingredients comprising acetoacetamide, urea and formaldehyde.

GAETANO F. D'ALELIO.